US011260870B2

(12) United States Patent
Zdych et al.

(10) Patent No.: US 11,260,870 B2
(45) Date of Patent: Mar. 1, 2022

(54) DETERMINING A MAXIMUM FRICTIONAL-CONNECTION COEFFICIENT

(71) Applicant: ZF FRIEDRICHSHAFEN AG, Friedrichshafen (DE)

(72) Inventors: Robert Zdych, Friedrichshafen (DE); Heinz-Joachim Gilsdorf, Donnersdorf (DE); Volker Wagner, Ravensburg (DE); Ulrich Mair, Friedrichshafen (DE); Lara Ruth Turner, Immenstaad (DE); Julian King, Rankweil (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 140 days.

(21) Appl. No.: 16/488,719

(22) PCT Filed: Jan. 31, 2018

(86) PCT No.: PCT/EP2018/052370
§ 371 (c)(1),
(2) Date: Aug. 26, 2019

(87) PCT Pub. No.: WO2018/153627
PCT Pub. Date: Aug. 30, 2018

(65) Prior Publication Data
US 2021/0129850 A1    May 6, 2021

(30) Foreign Application Priority Data
Feb. 27, 2017    (DE) .......................... 102017203171.9

(51) Int. Cl.
*B60W 40/068*    (2012.01)
*B60W 40/064*    (2012.01)
(Continued)

(52) U.S. Cl.
CPC ........ *B60W 40/068* (2013.01); *B60W 40/064* (2013.01); *B60C 11/246* (2013.01);
(Continued)

(58) Field of Classification Search
CPC .... B60W 40/12; B60W 40/068; B60W 50/14; B60W 2552/40; B60W 2556/45;
(Continued)

(56) References Cited

U.S. PATENT DOCUMENTS

| 6,470,731 | B1 * | 10/2002 | Rieth | .................... | B60W 30/16 73/9 |
| 2007/0142996 | A1 | 6/2007 | Lee | | |
| 2011/0166761 | A1 * | 7/2011 | Kammann | ............. | G01N 19/02 701/70 |

FOREIGN PATENT DOCUMENTS

| CN | 1781783 | B | * | 10/2011 | .............. | B60T 8/172 |
| DE | 102012217772 | A1 | * | 4/2014 | .......... | B60W 40/068 |
| JP | 2016016812 | A | * | 2/2016 | ............ | B60W 50/14 |

OTHER PUBLICATIONS

Maximizing the longitudinal traction of a wheel, Piyush Sudhir, Dawande Amol, Arun Durge, Keiki Tanabe, Publication No. IN1338/CHE/2014 A, Mar. 28, 2014 (Year: 2014).*

* cited by examiner

*Primary Examiner* — Hunter B Lonsberry
*Assistant Examiner* — Jay Khandpur
(74) *Attorney, Agent, or Firm* — Kristin L. Murphy

(57) ABSTRACT

A tire (100) rolls on a surface (105). A method (600) for providing maximum traction coefficient between the tire (100) and the surface (105) include steps for detecting a momentary slip of the tire (100) on the surface (105); detecting a momentary traction coefficient; forming a tuple (410, 510) from the slip and the current traction coefficient; choosing a characteristic curve (205, 305) from a number of
(Continued)

predetermined characteristic curves (205, 305) on the basis of the tuple (410, 510), whereby each characteristic curve (205, 305) describes a traction behavior of the tire (100) or a corresponding characteristic pitch; determining the maximum traction coefficient on the basis of the selected characteristic curves (205, 305); and thus providing the maximum traction coefficient.

8 Claims, 5 Drawing Sheets

(51) Int. Cl.
*B60C 11/24* (2006.01)
*G01N 19/02* (2006.01)
*G07C 5/00* (2006.01)
*B60W 40/12* (2012.01)
*B60W 50/14* (2020.01)
*G07C 5/08* (2006.01)
*B62D 15/02* (2006.01)

(52) U.S. Cl.
CPC .......... *B60T 2240/03* (2013.01); *B60W 40/12* (2013.01); *B60W 50/14* (2013.01); *B60W 2520/16* (2013.01); *B60W 2520/26* (2013.01); *B60W 2552/40* (2020.02); *B60W 2555/20* (2020.02); *B60W 2556/10* (2020.02); *B60W 2556/45* (2020.02); *B62D 15/029* (2013.01); *G01N 19/02* (2013.01); *G07C 5/008* (2013.01); *G07C 5/0808* (2013.01)

(58) Field of Classification Search
CPC ............. B60W 2555/20; B60C 11/246; B62D 15/029; G01N 19/02; G07C 5/008; G07C 5/0808; B60T 2240/03
See application file for complete search history.

DETERMINING A MAXIMUM FRICTIONAL-CONNECTION COEFFICIENT

CROSS-REFERENCE TO RELATED APPLICATIONS

This application is a national stage of International Application No. PCT/EP2018/052370, filed Jan. 31, 2018, the disclosure of which is incorporated herein by reference in its entirety, and which claimed priority to German Patent Application Serial No. 102017203171.9, filed Feb. 27, 2017, the full disclosure of which is incorporated herein by reference in entirety.

TECHNICAL FIELD

The invention refers to determining a maximum traction coefficient indicating a maximum transmissible force between the tire and the surface.

BACKGROUND

A motor vehicle drives on a surface. The surface is what actually comes in contact with the tire. The surface can be covered with some intermediate medium, like ice, wet film, lubricating film or the similar. If there is a longitudinal force, such as acceleration or a braking force acting between one of the wheels and the surface, then a rotation speed of the wheel may differ from the vehicle speed and a longitudinal slip occurs. When the wheel is under the influence of lateral force, for example when the vehicle is moving along a curve, then the plane of wheel rotation does not coincide with direction of its movement and a slipping angle occurs. The lateral force can act in both directions and a slipping angle can occur on either in controlled or uncontrolled wheel. Longitudinal slip and side-slip angle for the purpose of simplicity are indicated by symbol "$\lambda$".

A maximum transmission force acting between the wheel and the surface generally depends on $\lambda$ value and the maximum possible traction coefficient $\mu_{max}$. If this transferrable force between the wheel and the ground exceeds the maximum transmission force, the wheel is likely to spin or slip away and finally it may lead to complete loss of vehicle's control.

DE 10 2012 217 772 A1 refers to a technique for determining a maximum traction coefficient between a tire of a vehicle and a road surface.

SUMMARY

A tire rolls on a surface. The method for identifying a maximum traction coefficient between the tire and the surface includes several stages of detecting a momentary slip of a tire on the surface: detecting momentary traction coefficient; making up a tuple from a slip and a current traction coefficient or forming a tuple from the slip and corresponding pitch of momentary change of traction coefficient; choosing one characteristic from a number of predetermined ones on the basis of the corresponding tuple describing respectively a tire grip behavior and change of tire grip behavior on a specific surface; determining the maximum traction coefficient on the basis of selected characteristics and identifying the maximum traction coefficient.

In such a way the maximum traction coefficient can be determined quickly and safely. The determined maximum traction coefficient can be used to control a motor vehicle to which the wheel is attached. Thus, the driving safety of a vehicle can be improved. The characteristic curves can be represented as a table or as a field of characteristic or in parametric form, so that processing or memory capacity can be reduced to the minimum.

In the first implementation option of the method the predetermined traction curves are used, that respectively indicate the correlation between the slip and the tire grip coefficient (also known as traction coefficient) for various possible combinations of tires/surfaces. In this case, we choose a traction characteristic curve that includes a point to which the tuple comes as close as possible. The more traction characteristic curves are known, the more accurate the actual detection can be made. Inaccurate selection of an adjacent traction characteristic may reduce the quality of the result but generally would be a useful value. Only when the selected traction characteristic curve differs a lot from the correct traction characteristic the provided data can become unusable.

In the further method embodiment, a pitch of traction characteristic curve is determined at the point $\lambda$ and forms a new tuple that combines slip $\lambda$ and pitch m. The predetermined characteristic curves include then pitch characteristics, each indicating a pitch of a provided traction curve. Then we choose a pitch characteristic curve which comes as close as possible to the tuple of slip $\lambda$ and pitch m. It is not necessary to know the relative traction characteristic curves as detection of maximum traction coefficient is possible only on the basis of pitch characteristics.

The provided maximum traction coefficient can be determined based on a combination of relatively different types of characteristic curves of already detected maximum traction coefficients. In other words, both of the abovementioned techniques can be implemented in parallel and the maximum traction coefficients resulting from those techniques can be matched, correlated or combined with one another. Thereby accuracy and reliability of determination can be improved. For example, some arithmetic or other means can be used between provision and detection of maximum traction coefficients.

Provision of maximum traction coefficient can be discarded in further method embodiment of the invention, if two determined maximum traction coefficients differ from each other by more than a predetermined value. In this case processing data retrieval errors might be too great to determine a reliable maximum traction coefficient. The provision of a value can be prevented, or it will be a default value, a previous value or a rough estimate.

In another option of method implementation, a momentary traction coefficient is provided if it or its value is greater than the determined maximum traction coefficient. In particular the value of momentary traction coefficient can be provided. In this case determination procedure can be more conservative depending on the observed behavior of a tire on a surface. The procedure can be adapted to the peculiarities of present circumstances.

The method has demonstrated good results with respect to low to moderate traction coefficients, in particular in the first abovementioned implementation method. Under these conditions, tire grip characteristics can still be reliably distinguishable from one another. Considering high traction coefficients, real tire grip characteristics can be properly differentiated from one another only at larger $\lambda$ values. In order to make possible determination of high maximum traction coefficients even at low $\lambda$ values, we can choose a corresponding maximum traction coefficient or identify it only on the basis of its belonging to a corresponding industry, if the pitch of traction characteristic curve at present location exceeds a predetermined threshold.

In further method embodiment a histogram is formed based on a number of particular maximum traction coefficients and the quality of a particular maximum traction coefficient can be determined based on this histogram. Moreover, by a non-contentious provision of maximum traction coefficients in each circle of the method, the maximum traction coefficient can be determined but it will not be immediately provided; however, based on the input data histogram the maximum traction coefficient can be determined at any time. Thus, determination of maximum traction coefficient can be separated from its provision. Thereby, the provided value can be smoothed in course of time.

A software product comprises a program code meant for carrying out an abovementioned method when this software product is run on a processor or is stored in a computer-readable medium.

A device for providing a maximum traction coefficient between a tire and a surface on which the tire rolls includes: the first interface for detecting a current slip $\lambda$ of the tire; the second interface for detecting a momentary traction coefficient or a corresponding pitch and a processing device itself. In this case, a processing device is set up to form a tuple from a slip $\lambda$ and a traction coefficient $\mu$ or from a slip $\lambda$ and a pitch m; then we should choose a characteristic curve from a number of predetermined characteristic curves based on respective tuples; the characteristic curves respectively describing a tire grip behavior or a corresponding pitch of these characteristics; determine the maximum traction coefficient on the basis of these selected characteristic curves and derive the maximum traction coefficient.

In particular, in order to determine the maximum traction coefficient the device can be installed on board of a vehicle, especially in a real-time mode. The coefficient determination can be made individually for any type of tire or a motor vehicle. The processing device may include a programmable microcomputer or a microcontroller and in most cases is configured to carry out the abovementioned method entirely or partially. For this purpose this method can be presented in a form of software product. Because of substantial mutual similarity of the device and the method, advantages or features of one object may also be applicable to the other one and vice versa.

BRIEF DESCRIPTION OF THE DRAWINGS

Now the invention will be described in detail with regard to the attached figures describing the following.

DETAILED DESCRIPTION

Figure 1:
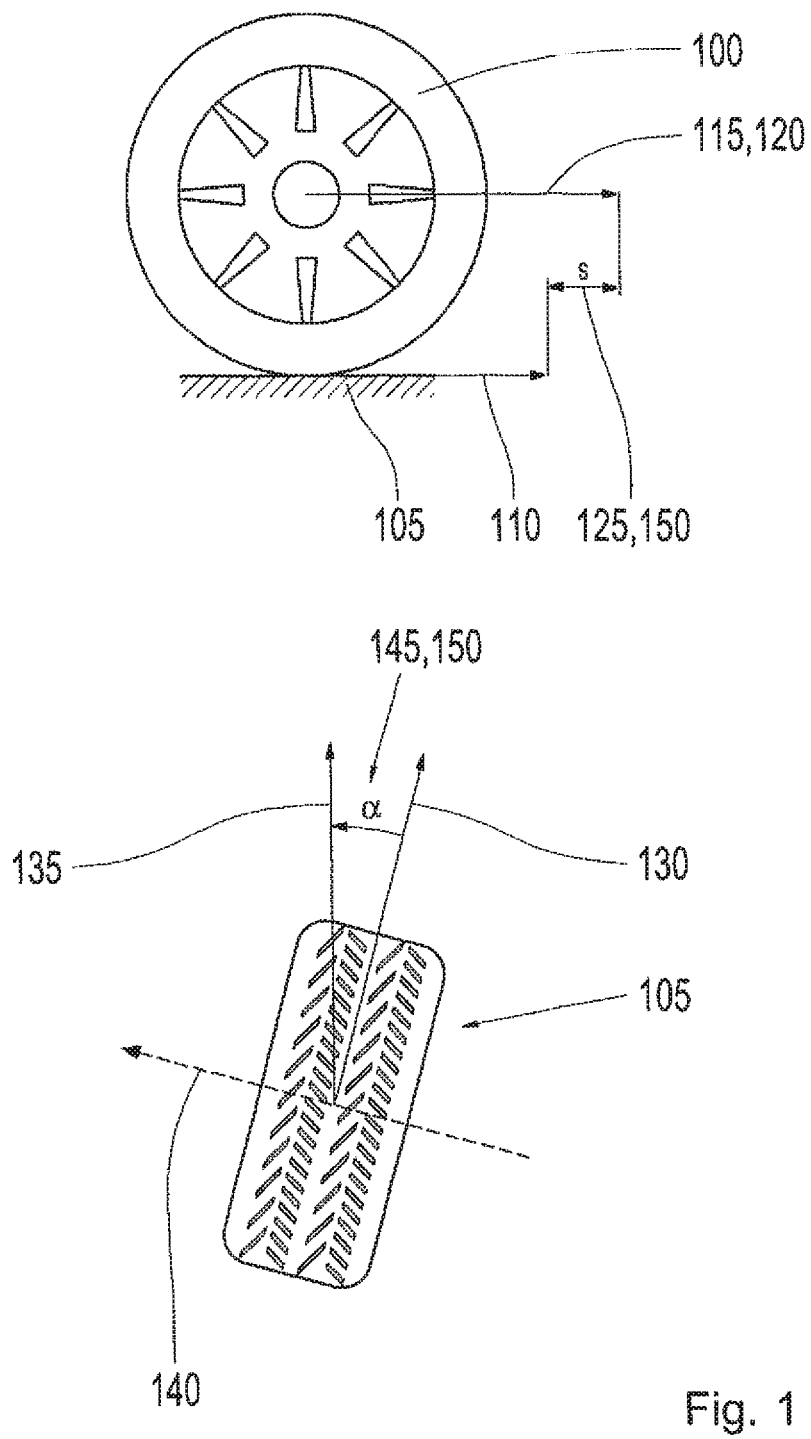
FIG. 1 illustrates a tire on a surface.

FIG. 1 shows a tire 100 on a surface 105 in profile view and in plan view. The surface 105 here is the surface with which tire comes in contact. The surface 105 can be covered with some intermediate medium like ice, wet film, lubricating film or the similar. This the intermediate medium is applied on the surface 105 and influences the condition of the surface 105. The tire 100 is usually means a wheel; however, in this description we consider mostly the friction properties between a tire 100 and a surface 105, so for consideration of vehicle handling the aforementioned tire 100 may also be considered as a synonym to a wheel.

In the profile view rotation speed 110 and longitudinal speed 115 are shown. The longitudinal speed 115 operates in a longitudinal direction 120 which is perpendicular to a rotational axis of the tire 100 and usually is carried out parallel to the surface 105. A difference between speeds 110 and 115 produces a longitudinal slip 125 that can be referred to as s.

In a plan view a plane of rotation 130 and a direction of movement 135 are shown. The plane of rotation 130 is perpendicular to a transverse direction 140 that goes parallel to the axis of tire 100 rotation. The transverse direction 140 goes parallel to an axis of tire 100 rotation and mostly coincides with it. Between a plane of rotation 130 and a direction of movement 135 there is a slip angle 145 that can be designated as $\alpha$.

With regard to a traction coefficient $\mu$ acting between the tire 100 and the surface 105 there appears a longitudinal slip 125 that produces a force acting in longitudinal direction 120 along with a side-slip angle 145 which influences on the generated transverse force 140. Therefore, for the purpose of the following explanation a slip 150 is used as a higher-order superior term for the longitudinal slip 125 and a side-slip angle 145 and is indicated as $\lambda$.

Figure 2:
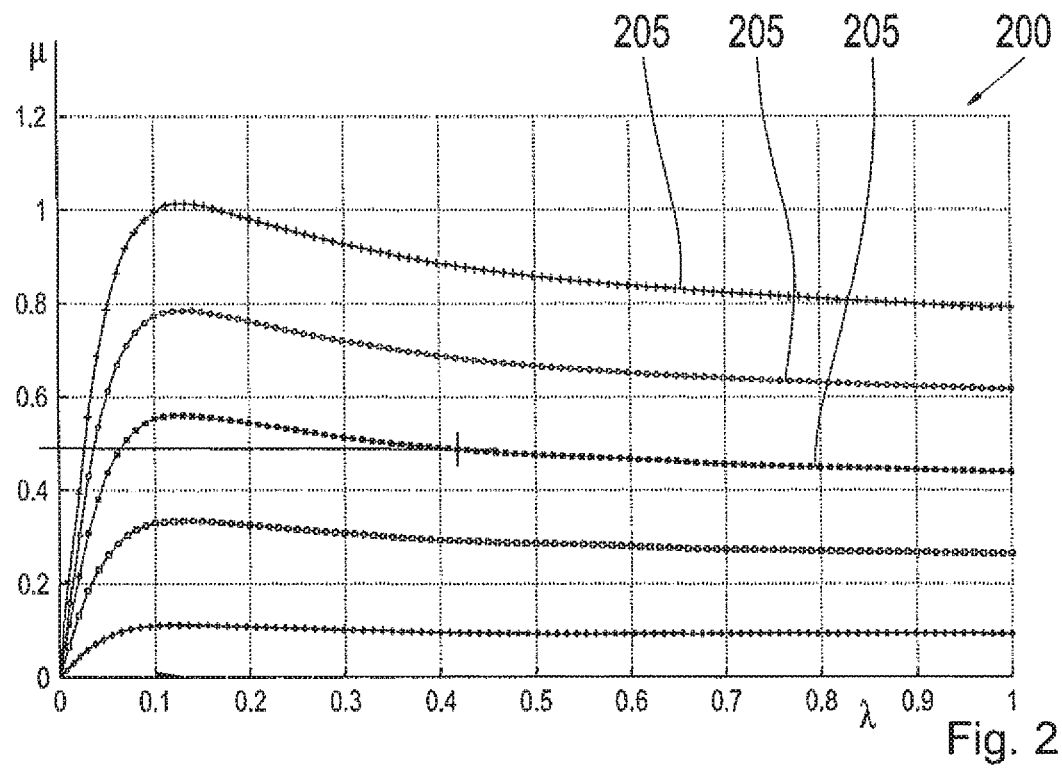
FIG. 2 illustrates a traction characteristic curve between slip of a tire and its traction coefficient.

FIG. 2 shows a tire diagram 200 with a number of exemplary traction characteristics 205, each of those describing a correlation between a slip $\lambda$ 150 and a momentary traction $\mu$ coefficient.

Figure 3:
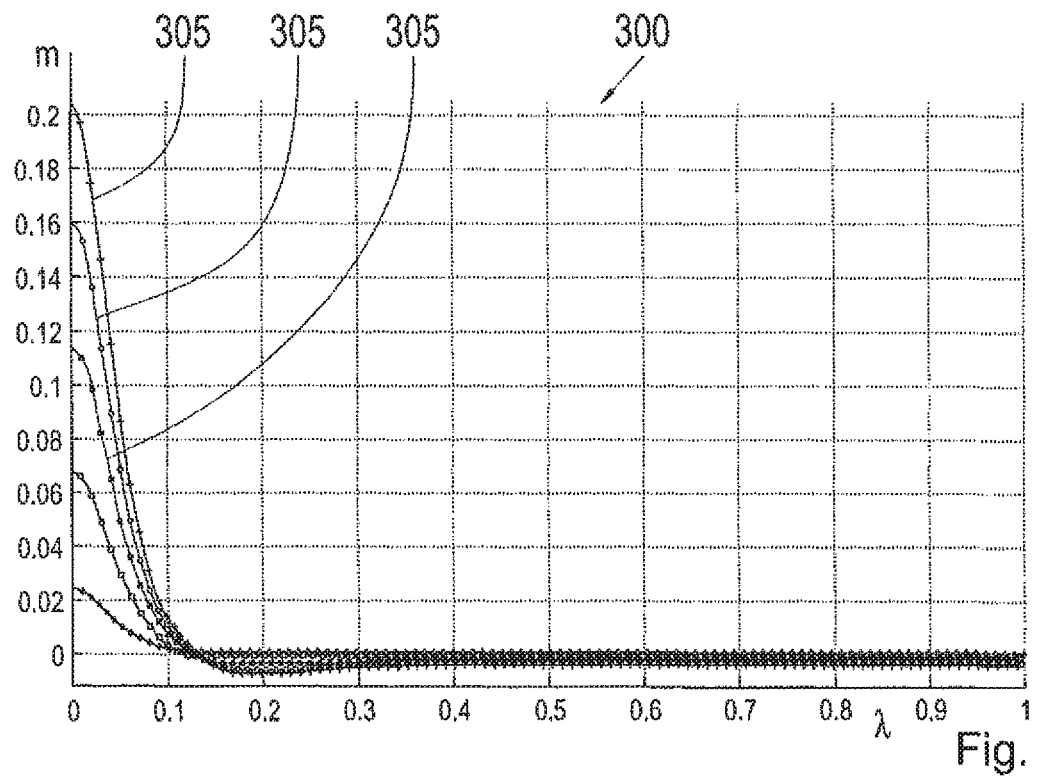
FIG. 3 illustrates a pitch characteristic curve as a derivative of traction characteristic curve in FIG. 2.

FIG. 3 shows a pitch diagram 300 with exemplary pitch characteristic curves 305, each representing a pitch m of a corresponding traction characteristic curve 205. Thus, each pitch characteristic curve describes a relationship between a slip 150 and the pitch of traction coefficient $\mu$ with regard to the slip 150.

Figure 4:
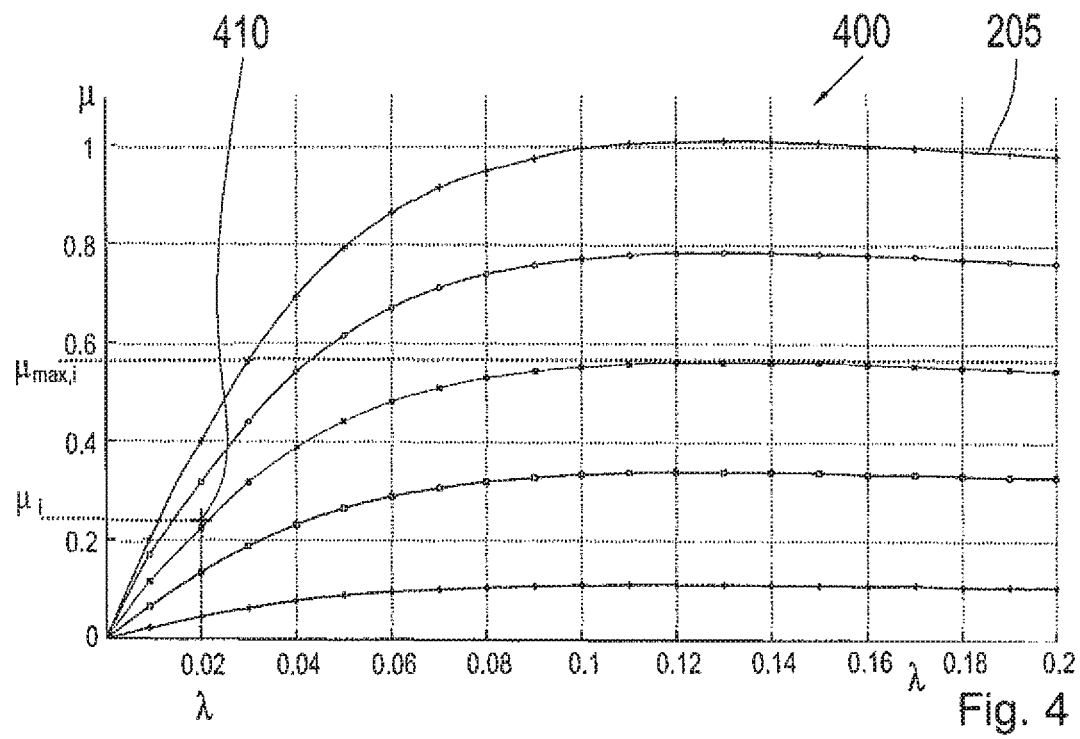
FIG. 4 illustrates a traction characteristic curve as enlargement of an abstract of FIG. 2.

FIG. 4 shows a further tire diagram 400 as a detailed enlargement of the tire diagram 200 of FIG. 2 in which a correlation between a slip $\lambda$ 150 and a momentary traction coefficient $\mu$ 410 is described.

Figure 5:
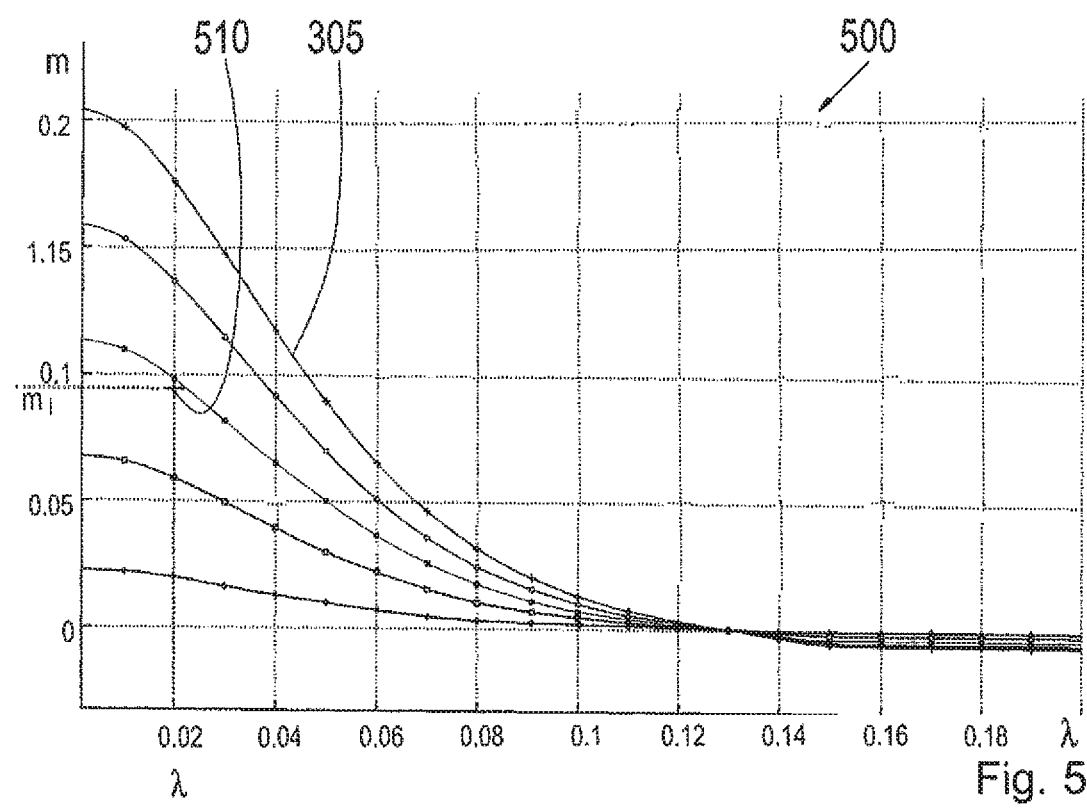
FIG. 5 illustrates a traction characteristic curve as an enlargement of an abstract of FIG. 3.

FIG. 5 shows a further pitch diagram 500 as a detailed enlargement of the pitch diagram 300 of FIG. 3 describing a correlation between a slip $\lambda$ 150 and an actual pitch m 510 value.

Each traction characteristic curve 205 and each pitch characteristic curve 305 respectively describes a tire grip behavior and the frictional connection between the tire 100 and the surface 105 under the predetermined conditions. In particular these conditions relate to the tire 100 with respect to tire type, dimensions, temperature, air pressure, material, tread or wear conditions and the surface 105 with respect to roughness, material, temperature or humidity. Whereas properties of the tire 100 usually change very slowly, the characteristics of the surface being driven can change rapidly. If we take into consideration a number of vehicle's tires 100, then an individual characteristic curves 205, 305 can be provided or determination on different types of tire 100 can be made on the basis of general characteristics 205, 305.

According to the invention a tuple 410 can be formed that includes a slip 150 and a related momentary traction $\mu$ coefficient. In the first method embodiment a detected traction characteristic curve 205 comprises the point which comes as close as possible to the tuple 410. In other words, we can determine to which traction characteristic curve 205 the tuple 410, in its representation as a point in λ-μ plane, has the smallest distance. Then this traction characteristic curve 205 is chosen from a number of predetermined traction characteristic curves 205. The maximum traction coefficient $\mu_{max}$ can then be determined from the maximum of the selected traction characteristic curve 205.

In a second implementation option, first of all we should determine a pitch m of the traction characteristic curve of a tire 100 at one point. For this purpose it may be necessary to define the traction characteristic curve of the tire 100 in the point area by adding more points based on additional findings of the slip λ and corresponding momentary traction coefficients μ if the pitch m of the traction characteristic curve 205 in the area of the point is determined, then another tuple 510 can be formed that comprises the slip λ and the pitch m of the traction characteristic curve 205 of the tire 100. Then, from pitch characteristic curves 305, we can choose the one that better fits to this further tuple 510. In particular, we can choose the pitch characteristic curve 305 which distance to the tuple 510 is the smallest. Then, on the basis of the chosen pitch characteristic curve 305, the maximum traction coefficient $\mu_{max}$ can be derived.

In the abovementioned implementation option, the related pitch characteristic curve 305 can also be determined for a chosen pitch characteristic curve 205 on the basis of which the maximum traction coefficient $\mu_{max}$ can be derived, in particular with respect to the second implementation option described.

Figure 6:
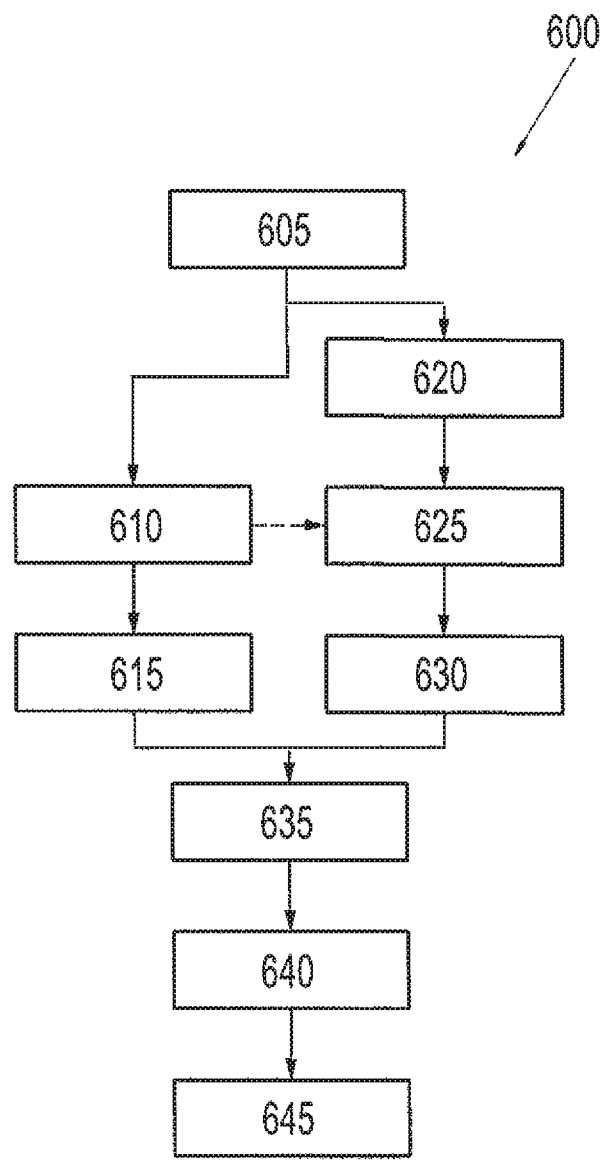
FIG. 6 illustrates a schematic diagram of the method for determining maximum traction coefficient in a pair of tires and surface.

FIG. 6 shows a diagram of the method 600 for providing a maximum traction coefficient $\mu_{max}$ between a tire 100 and a surface 105 on which the tire 100 rolls. The following explanations of the method partly refer to the exemplary illustrations of FIGS. 1 to 5. The method 600 is mostly focused on implementation on board a motor vehicle in order to actually determine the maximum traction coefficient $\mu_{max}$ in current conditions. For this purpose, the method 600 is better performed periodically and desirably in real time, i.e. with a guaranteed maximum delay between the detection time of λ and μ and provision of maximum traction coefficient $\mu_{max}$. The provided maximum traction coefficient $\mu_{max}$ can be used in control equipment on board a vehicle in order to improve the longitudinal or lateral handling of the motor vehicle.

In step 605 of the method 600 the slip λ and the momentary traction coefficient μ are detected in a real driving situation. A tuple 410 is preferably formed out of these two values.

The detection may require accepting a value through the interface, especially in case when a control device is located on board a vehicle. The value may include a momentary traction coefficient μ or a slip λ or one or more values from which the required parameter can be derived.

The momentary traction coefficient can be detected, for example, as the quotient derived from a directly measured-tire tangential force and directly measured tire normal force. There might be other reasons to measure these forces on a motor vehicle.

In another option the momentary traction coefficient can also be determined on the basis of a model. In particular, the model may be a computer model operated on the basis of, for example, a yaw rate of a vehicle, rotating speed of the tire 100 or some other tire 100, or on the basis of accelerations. The obtained variables can be recorded or determined, for example, on a conventional motor vehicle by means of already existing sensor system, so that the currently acting traction coefficient can be determined simply and accurately.

In another option a longitudinal force currently acting on the tire is determined, and the momentary traction coefficient is detected as the quotient of the longitudinal force and a normal force. A corresponding detection can be made with regard to the transverse force. In another option, a transverse force currently acting on the tire is determined, and the momentary traction coefficient is detected as the quotient of a lateral force and a normal force.

In a first method embodiment 600 we define a tuple 410 in the first step 610, and in the second step 615 we choose the best matching traction characteristic curve 205 to the tuple 410 from a number of predetermined traction characteristic curves 205, as was mentioned above; in particular with regard to the FIG. 4 where it is described in more detail. The maximum traction coefficient $\mu_{max}$ can then be determined with respect to the chosen traction characteristic curve 205, and in particular from the maximum of the traction characteristic curve 205.

In a second method embodiment at the end of step 605 and in step 620 we determine the pitch m of the traction characteristic curve 205 based on the available slip 150. We can calculate this from quotient of the difference of momentary traction coefficient and the corresponding slip difference 150 (as mentioned above, in particular with regard to FIG. 5). In step 625 the tuple 510 can be formed from the slip 150 and the pitch m. In step 630 the pitch characteristic curve 305 can be chosen from a number of predetermined pitch characteristic curves 305 that best fit to the particular pitch m of the current slip 150, as it has the smallest distance to tuple 510. The maximum traction coefficient $\mu_{max}$ then can be assigned based on the selected pitch characteristic curve 305.

By means of steps 610 to 615 we can determine the first maximum traction coefficient $\mu_{max}$ and by means of steps 620 to 630 the second maximum traction $\mu_{max}$ coefficient. When more than one maximum traction coefficient $\mu_{max}$ is determined, then the determined maximum traction coefficients $\mu_{max}$ can be fitted in context in order to improve or determine the overall determination accuracy and/or to increase accuracy of detection.

In the step 635 we can determine, for example, whether the determined maximum traction coefficients $\mu_{max}$ differ from each other by more than a predetermined amount. In this case there might be an increased measurement noise, uncertainty of detection or processing or measurement error. Then, further processing and especially procedure on deriving a certain maximum traction coefficient $\mu_{max}$ can be abolished.

The maximum traction coefficients determined at the step 640 $\mu_{max}$ can also be combined with each other. For example, we can use from time to time one or the other specific maximum traction $\mu_{max}$ coefficient. It is also possible to use other means of detection, such arithmetic average of already determined maximum traction $\mu_{max}$ coefficients. In the final step 645 the determined maximum traction coefficient $\mu_{max}$ is provided.

In further implementation option the determined maximum traction coefficient $\mu_{max}$, that is the first, the second or the combined maximum traction coefficient $\mu_{max}$, can be subjected to a further processing. For example, a histogram of past values of maximum traction coefficients $\mu_{max}$ can be used. In each case the values of a predetermined past period or all known values can also be taken into consideration. In this case the determined values are divided into predefined ranges and then we select the values that fall within the individual ranges. The range with the highest values can provide a hypothesis for the most probable maximum traction coefficients $\mu_{max}$. By comparing these values with values from other ranges, a relative probability can be determined as a reliable measurement.

In further implementation options the determined maximum traction coefficients $\mu_{max}$ are not provided for each pass of the method 600, instead the most probable maximum traction coefficient based on the histogram $\mu_{max}$ is provided. The output interval of the most probable value for the maximum traction coefficients $\mu_{max}$ can thereby be separated from the cycle interval in which the method 600 is performed.

Figure 7:
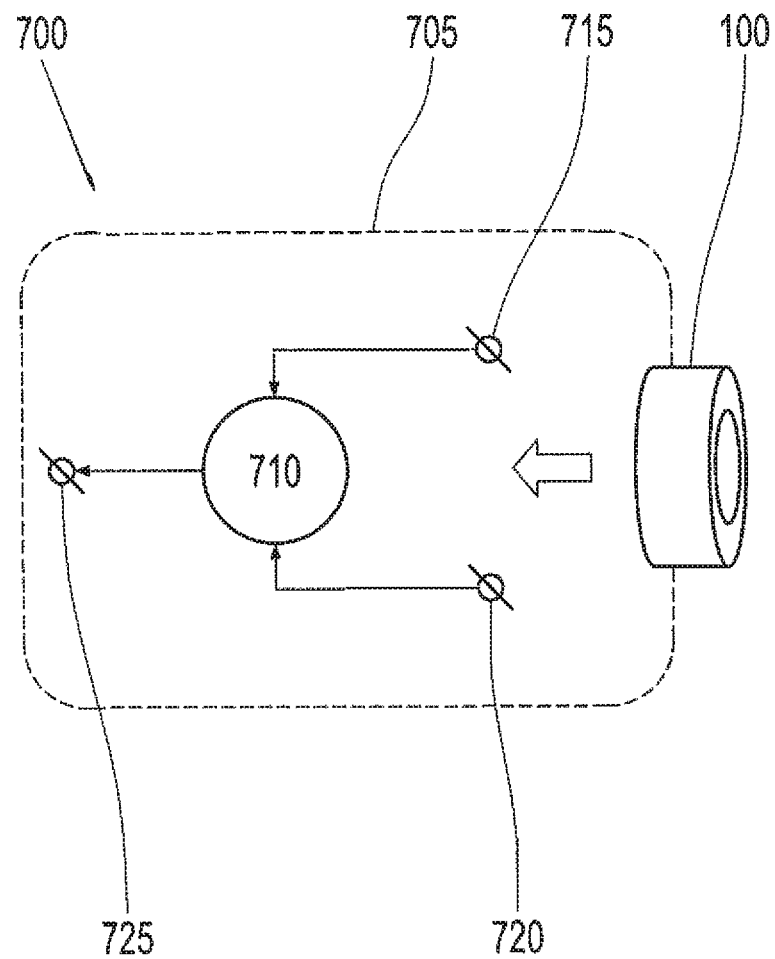
FIG. 7 illustrates a schematic representation of a device for determining maximum traction coefficients.

The FIG. 7 shows a schematic image of exemplary device 700 for determining maximum traction coefficients $\mu_{max}$ on any type of tire mounted on a vehicle 705. The device 700 includes a processing device which comprises a programmable microcomputer and can be configured to perform the abovementioned method 600 described entirely or in part. Moreover, the device 700 includes the first interface 715 to receive the first value and the second interface 720 to receive a second value, and desirably the third interface 725 designated for providing a specific maximum traction coefficient $\mu_{max}$. Some of the interfaces 715, 720 and 725 may also coincide or integrate with each other.

In the preferred implementation option, the value for the interface 715 includes a λ-value 150 and the value for the interface 720 of the current traction coefficient μ. In another implementation option the other values are taken, from which, as was mentioned above, the λ-value 150 or the momentary traction coefficient μ can be determined.

SUMMARY

A tire rolls on a surface. A method for providing maximum traction coefficient between the tire and the surface include steps for detecting a momentary slip of the tire on the surface; detecting a momentary traction coefficient; forming a tuple from the slip and the current traction coefficient; choosing a characteristic curve from a number of predetermined characteristic curves on the basis of the tuple, whereby each characteristic curve describes a traction behavior of the tire or a corresponding characteristic pitch; determining the maximum traction coefficient on the basis of the selected characteristic curves; and thus providing the maximum traction coefficient.

The invention claimed is:

1. A method for providing a maximum traction coefficient between a tire and a surface on which the tire runs by an on-board processing device on a vehicle in real-time, the method comprising:
   providing a plurality of predetermined traction characteristic curves in a memory of the on-board processing device, whereby each characteristic curve describes a different traction behavior of the tire;
   detecting current slip of the tire on the surface;
   detecting current traction coefficient;
   forming a first tuple from the detected slip and the detected traction coefficient;
   providing a plurality of predetermined pitch characteristic curves in the memory of the on-board processing device, whereby each pitch characteristic curve describes a different pitch curve of the tire;
   detecting a pitch based on the detected slip;
   forming a second tuple from the detected slip and the detected pitch;
   operating the processing device to choose a traction characteristic curve from the plurality of predetermined traction characteristic curves that best matches to the first tuple;
   operating the processing device to choose a pitch characteristic curve from the plurality of predetermined pitch characteristic curves based on the second tuple; and
   providing the maximum traction coefficient from the processing device of the chosen pitch characteristic curve.

2. The method according to claim 1, wherein each of the predetermined traction characteristic curves indicates a correlation between a slip and a traction coefficient; and wherein choosing a characteristic curve further comprises choosing the characteristic curve that includes a point to which the tuple comes as close as possible.

3. The method according to claim 1, wherein each of the predetermined pitch characteristic curves indicates a pitch of traction characteristics; and wherein choosing a pitch characteristic curve that comes as near as possible to the second tuple based on slip and pitch m.

4. The method according to claim 2, wherein the provided maximum traction coefficient is determined based on a combination of maximum traction coefficients detected with regard to different types of characteristics.

5. The method according to claim 1, wherein the provided maximum traction coefficient from the chosen characteristic curve and the provided maximum traction coefficient from the chosen pitch characteristic curve are compared and a selected maximum traction coefficient is provided only if a difference between the provided maximum traction coefficient from the chosen characteristic curve and the provided maximum traction coefficient from the chosen pitch characteristic curve does not exceed a predetermined value.

6. The method according to claim 2, whereby a momentary traction coefficient is provided if it is greater than the determined maximum traction coefficient.

7. The method according to claim 2, wherein the maximum traction coefficient is provided only if the pitch exceeds a predetermined threshold.

8. The method according to claim 2, whereby a histogram is formed based on a number of determined maximum traction coefficients; and wherein a quality of a given maximum traction coefficient based on the histogram.

* * * * *